US012616991B2

(12) United States Patent
Orita et al.

(10) Patent No.: US 12,616,991 B2
(45) Date of Patent: May 5, 2026

(54) ULTRASONIC ATOMIZATION APPARATUS

(71) Applicant: Toshiba Mitsubishi-Electric Industrial Systems Corporation, Tokyo (JP)

(72) Inventors: Hiroyuki Orita, Tokyo (JP); Takahiro Hiramatsu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 544 days.

(21) Appl. No.: 17/429,642

(22) PCT Filed: Jan. 17, 2020

(86) PCT No.: PCT/JP2020/001494
§ 371 (c)(1),
(2) Date: Aug. 10, 2021

(87) PCT Pub. No.: WO2021/144959
PCT Pub. Date: Jul. 22, 2021

(65) Prior Publication Data

US 2022/0111412 A1 Apr. 14, 2022

(51) Int. Cl.
*B05B 17/06* (2006.01)

(52) U.S. Cl.
CPC ................................ *B05B 17/0615* (2013.01)

(58) Field of Classification Search
CPC .............. B05B 17/0615; B05B 7/0012; B05B 17/0653; B05B 17/0669; B05B 17/0607; B05B 7/2491
USPC ...................................................... 239/102.2
See application file for complete search history.

(56) References Cited

U.S. PATENT DOCUMENTS

| | | | | |
|---|---|---|---|---|
| 3,840,391 A * | 10/1974 | Spitz | B05B 17/0615 | 427/314 |
| 4,976,259 A * | 12/1990 | Higson | A61M 15/0085 | 239/102.1 |
| 10,456,802 B2 * | 10/2019 | Orita | B05B 17/0615 | |
| 2005/0268668 A1 * | 12/2005 | Miyauti | A47L 15/0089 | 68/3 R |
| 2008/0223953 A1 * | 9/2008 | Tomono | A61M 11/005 | 128/200.16 |
| 2010/0196216 A1 | 8/2010 | Yokoi et al. | | |
| 2012/0129091 A1 * | 5/2012 | Kenjoh | G03G 9/08711 | 430/137.1 |

(Continued)

FOREIGN PATENT DOCUMENTS

| | | | |
|---|---|---|---|
| CN | 1706559 A * | 12/2005 | A47L 15/0002 |
| CN | 105451891 A | 3/2016 | |

(Continued)

OTHER PUBLICATIONS

Office Action issued on Nov. 2, 2022, in corresponding Chinese patent Application No. 202080011751.7, 10 pages.
Office Action issued on Nov. 24, 2021, in corresponding Japanese patent Application No. 2021-513926, 7 pages.
Office Action issued on Nov. 26, 2021, in corresponding Taiwanese patent Application No. 109146004, 9 pages.

(Continued)

*Primary Examiner* — Arthur O. Hall
*Assistant Examiner* — Anna Thi Ho
(74) *Attorney, Agent, or Firm* — XSENSUS LLP

(57) ABSTRACT

In an ultrasonic atomization apparatus being the present invention, a source solution is accommodated in a separator cup being a part of a container. A constituent material of the separator cup is PTFE being one of fluorocarbon resins, whose entire thickness is uniformly 0.5 mm. Therefore, the separator cup satisfies a thin film condition that "the thickness of a bottom surface BP1 is 0.5 mm or less".

5 Claims, 8 Drawing Sheets

101

(56) References Cited

U.S. PATENT DOCUMENTS

| | | | | |
|---|---|---|---|---|
| 2016/0158788 | A1* | 6/2016 | Orita | B05B 17/06 239/102.1 |
| 2017/0072085 | A1* | 3/2017 | Gruenbacher | A61L 9/14 |
| 2020/0360957 | A1 | 11/2020 | Sakuma et al. | |
| 2020/0376515 | A1* | 12/2020 | Nagaoka | H01L 21/02414 |

FOREIGN PATENT DOCUMENTS

| | | | | | |
|---|---|---|---|---|---|
| FR | 2690634 | A1 | * | 11/1993 | B05B 17/06 |
| FR | 2699510 | A1 | * | 6/1994 | B05B 17/0615 |
| JP | S55-68576 | U | | 5/1980 | |
| JP | H06-015757 | U | | 3/1994 | |
| JP | 2000271517 | A | * | 10/2000 | |
| JP | 2005111328 | A | * | 4/2005 | |
| JP | 2005305233 | A | * | 11/2005 | |
| JP | 2016189922 | A | * | 11/2016 | |
| JP | 2016190172 | A | * | 11/2016 | |
| JP | 2018069195 | A | * | 5/2018 | |
| WO | WO-2008149334 | A2 | * | 12/2008 | B05B 17/0615 |
| WO | WO-2012043682 | A1 | * | 4/2012 | A61L 2/22 |
| WO | WO-2014109130 | A1 | * | 7/2014 | A61M 15/0028 |
| WO | 2015/019468 | A1 | | 2/2015 | |
| WO | WO-2019168028 | A1 | * | 9/2019 | B05B 17/06 |
| WO | WO-2020241150 | A1 | * | 12/2020 | |

OTHER PUBLICATIONS

International Search Report and Written Opinion mailed on Apr. 7, 2020, received for PCT Application PCT/JP2020/001494, Filed on Jan. 17, 2020, 9 pages including English Translation.

Office Action issued Apr. 5, 2023 in Korean Patent Application No. 10-2021-7023824, 6 pages.

Extended European search report issued on Jul. 28, 2022, in corresponding European patent Application No. 20913079.8, 9 pages.

Office Action issued on May 10, 2022, in corresponding Chinese patent Application No. 202080011751.7, 12 pages.

International Preliminary Report on Patentability issued Jul. 21, 2022 in International Application PCT/JP2020/001494.

Chinese Office Action issued Aug. 10, 2022 in corresponding Chinese Patent Application No. 202080011751.7 (with English translation), 10 pages.

Office Action issued Jun. 27, 2024 in European Patent Application No. 20913079.8.

Extended European Search Report issued Jan. 13, 2025 in European Patent Application No. 24204616. 7.

Notice of Reexamination issued Dec. 17, 2025 in Chinese Patent Application No. 202080011751.7 with English translation thereof.

Decision on Reexamination (No. 2250869) issued Feb. 27, 2026 in Chinese Patent Application No. 202080011751.7 with English translation.

* cited by examiner

ULTRASONIC ATOMIZATION APPARATUS

CROSS-REFERENCE TO RELATED APPLICATION

The present application is based on PCT filing PCT/JP2020/001494, filed Jan. 17, 2020, the entire contents of which are incorporated herein by reference. This application is related to U.S. patent application Ser. No. 17/429,647, entitled ULTRASONIC ATOMIZATION APPARATUS, filed on the same day as this application and is hereby incorporated by reference.

TECHNICAL FIELD

The present invention relates to an ultrasonic atomization apparatus that atomizes a source solution into fine mist by using an ultrasonic vibrator and transfers the mist to the outside.

BACKGROUND ART

In a field of manufacturing electronic devices, an ultrasonic atomization apparatus is used in some cases. In the field of the electronic device manufacturing, the ultrasonic atomization apparatus atomizes a solution by using ultrasonic waves that are oscillated from an ultrasonic vibrator, and sends out the atomized solution to the outside by using transfer gas. When the source solution mist transferred to the outside is sprayed onto a substrate, a thin film for the electronic device is formed on the substrate.

Various solvents are used for the source solution used in the film formation, and in order to prevent erosion of the ultrasonic vibrator, a double chamber method, in which the source solution and the ultrasonic vibrator do not come into contact with each other, is used. In the double chamber method, in order to separate the ultrasonic vibrator and the source solution, a separator cup for accommodating the source solution is used separately for a water tank provided with the ultrasonic vibrator in its bottom surface. The separator cup is required to allow transmission of ultrasonic waves, and a material that easily transmits ultrasonic waves, such as polyethylene and polypropylene (PP), is used as its constituent material. Further, polyethylene and polypropylene have properties of being easily subjected to formation as well.

One example of the ultrasonic atomization apparatus employing the double chamber method described above is an atomization apparatus disclosed in Patent Document 1.

PRIOR ART DOCUMENTS

Patent Documents

Patent Document 1: WO 2015/019468

SUMMARY

Problem to be Solved by the Invention

In general, toluene, ether, and the like, which are solvents high in solubility, are used as a solvent of the source solution. This is because toluene and ether have properties of high resin solubility.

However, when toluene and ether are used as a solvent of the source solution in a conventional ultrasonic atomization apparatus, the high resin solubility of the solvent may cause a leakage of the source solution due to swelling and deformation of the separator cup using polyethylene or polypropylene as its constituent material, or opening of a hole in the separator cup.

This results in deterioration of accommodation stability of the source solution in the conventional ultrasonic atomization apparatus, which poses a problem that the source solution mist of an appropriate atomization amount cannot be generated.

The present invention has an object to provide an ultrasonic atomization apparatus that solves the problem as described above, that is excellent in tolerance to a source solution, and that can generate a source solution mist of an appropriate atomization amount.

Means to Solve the Problem

An ultrasonic atomization apparatus according to the present invention includes: a container including a separator cup configured to accommodate a source solution at a lower part; an internal hollow structure body including a hollow inside being provided above the separator cup in the container; a water tank configured to accommodate an ultrasonic wave conveyance medium inside, the water tank and the separator cup being positioned so that a bottom surface of the separator cup is immersed in the ultrasonic wave conveyance medium; and at least one ultrasonic vibrator provided in a bottom surface of the water tank. The separator cup uses fluorocarbon resin as a constituent material, whose entire thickness is uniform and satisfying a thin film condition. The thin film condition is that "the entire thickness is 0.5 mm or less".

Effects of the Invention

The constituent material of the bottom surface of the separator cup in the ultrasonic atomization apparatus being the invention of the present application according to claim 1 is fluorocarbon resin. The fluorocarbon resin has properties of having relatively high tolerance to various solvents. Thus, the separator cup of the ultrasonic atomization apparatus can exert relatively high tolerance to the source solution.

In addition, through satisfaction of the thin film condition that "the entire thickness is 0.5 mm or less", the separator cup being the invention of the present application according to claim 1 enhances transmissiveness of ultrasonic waves in the bottom surface, and can thus generate a source solution mist with an appropriate atomization amount.

As a result, the invention of the present application according to claim 1 produces effects of being excellent in tolerance to the source solution, and enabling generation of the source solution mist of an appropriate atomization amount.

These and other objects, features, aspects and advantages of the present invention will become more apparent from the following detailed description when taken in conjunction with the accompanying drawings.

DESCRIPTION OF EMBODIMENTS

First Embodiment

Figure 1:
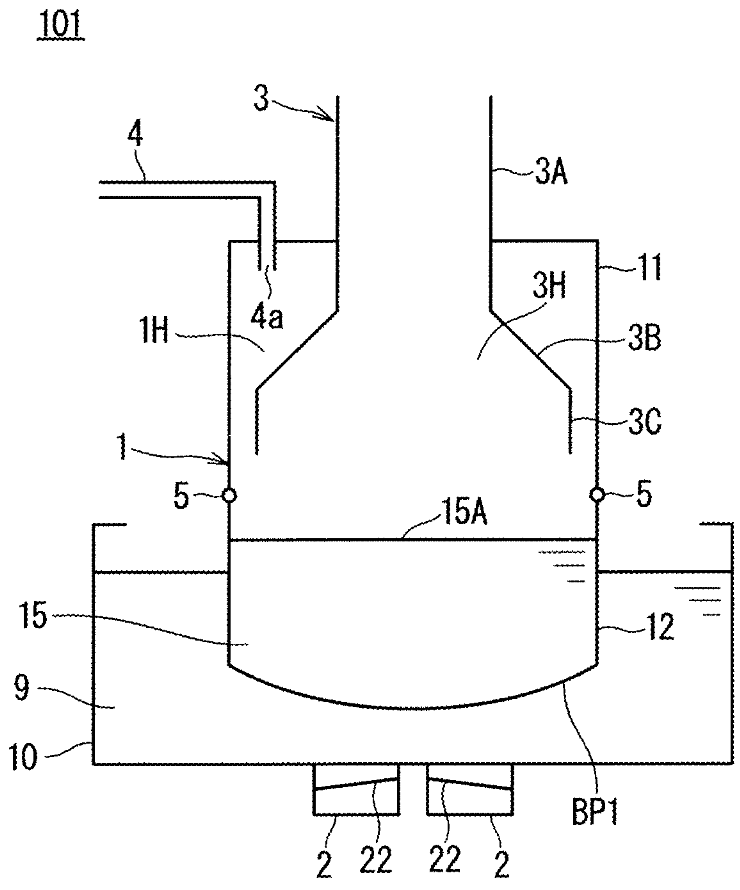
FIG. 1 is an explanatory diagram (No. 1) illustrating a configuration of an ultrasonic atomization apparatus being a first embodiment of the present invention.
Figure 2:
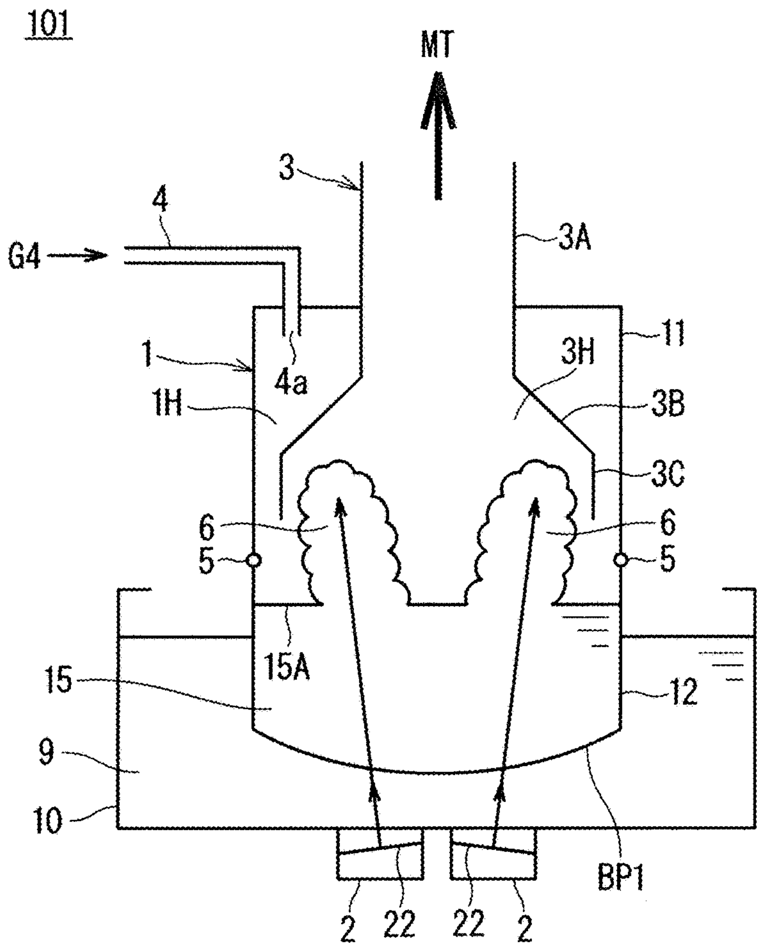
FIG. 2 is an explanatory diagram (No. 2) illustrating a configuration of the ultrasonic atomization apparatus of the first embodiment.

FIG. 1 and FIG. 2 are each an explanatory diagram schematically illustrating a configuration of an ultrasonic atomization apparatus 101 being a first embodiment of the present invention. FIG. 1 illustrates a case at the time of an initial state (No. 1), and FIG. 2 illustrates a case at the time of generation of a source solution mist MT (No. 2).

As illustrated in FIG. 1 and FIG. 2, the ultrasonic atomization apparatus 101 includes a container 1, an ultrasonic vibrator 2 being an atomizer, an internal hollow structure body 3, and a gas supply unit 4. Further, as illustrated in FIG. 1 and FIG. 2, the container 1 has a structure in which an upper cup 11 and a separator cup 12 are coupled together by a connector 5.

The upper cup 11 may have any shape as long as the upper cup 11 is a container having a space formed inside. In the ultrasonic atomization apparatus 101, the upper cup 11 has a substantially cylindrical shape, and in the upper cup 11, a space surrounded by a side surface being formed in a circular shape in plan view is formed.

Meanwhile, in the separator cup 12, a source solution 15 is accommodated. The constituent material of the separator cup 12 is polytetrafluoroethylene (PTFE) being one of fluorocarbon resins, whose entire thickness is uniformly 0.5 mm. Specifically, the separator cup 12 uses PTFE as its constituent material, and has a bottom surface BP1 having a thickness of 0.5 mm.

As described above, the separator cup 12 according to the first embodiment has features in that the separator cup 12 satisfies a thin film condition that "the thickness of the bottom surface BP1 is 0.5 mm or less".

Further, in the first embodiment, the ultrasonic vibrator 2 applies ultrasonic waves to the source solution 15 in the separator cup 12, and thereby atomizes the source solution 15. Four ultrasonic vibrators 2 (only two of them are illustrated in FIG. 1 and FIG. 2) are disposed in a bottom surface of a water tank 10. Note that the number of ultrasonic vibrators 2 is not limited to four. One ultrasonic vibrator 2 or two or more ultrasonic vibrators 2 may be provided.

The internal hollow structure body 3 is a structure body including a hollow in side. In an upper surface part of the upper cup 11 of the container 1, an opening part is formed, and as illustrated in FIG. 1 and FIG. 2, the internal hollow structure body 3 is disposed in a manner of being inserted into the upper cup 11 through the opening part. Here, in a state in which the internal hollow structure body 3 is inserted in the opening part, a part between the internal hollow structure body 3 and the upper cup 11 is hermetically closed. In other words, the part between the internal hollow structure body 3 and the opening part of the upper cup 11 is sealed.

For the shape of the internal hollow structure body 3, any shape may be adopted as long as the shape is a shape in which a hollow is formed inside. In the configuration example of FIG. 1 and FIG. 2, the internal hollow structure body 3 has a flask-like cross-sectional shape without a bottom surface. More specifically, the internal hollow structure body 3 illustrated in FIG. 1 includes a tubular part 3A, a circular truncated cone part 3B, and a cylindrical part 3C.

The tubular part 3A is a tubular path part having a cylindrical shape, and the tubular part 3A extends from the outside of the upper cup 11 to the inside of the upper cup 11 in a manner of being inserted through the opening part provided in the upper surface of the upper cup 11. More specifically, the tubular part 3A is divided into an upper tubular part disposed on the outside of the upper cup 11 and a lower tubular part disposed on the inside of the upper cup 11. Further, the upper tubular part is attached from the outside of the upper surface of the upper cup 11, and the lower tubular part is attached from the inside of the upper surface of the upper cup 11, and in a state in which these are attached together, the upper tubular part and the lower tubular part communicate to each other through the opening part disposed on the upper surface of the upper cup 11. One end of the tubular part 3A is connected to, for example, the inside of a thin-film film forming apparatus that forms a thin film by using a source solution mist MT, which is present on the outside of the upper cup 11. In contrast, another end of the tubular part 3A is connected to an upper end side of the circular truncated cone part 3B inside the upper cup 11.

The circular truncated cone part 3B has its external appearance (side wall surface) of a circular truncated cone shape, and has a hollow being formed inside. The circular truncated cone part 3B has its upper surface and bottom surface being opened. In other words, the hollow being formed inside is closed, and there are no upper surface and bottom surface. The circular truncated cone part 3B is present in the upper cup 11, and as described above, the upper end side of the circular truncated cone part 3B connects (communicates) to the another end of the tubular part 3A, and a lower end portion side of the circular truncated cone part 3B is connected to the upper end side of the cylindrical part 3C.

Here, the circular truncated cone part 3B has a cross-sectional shape that is widened toward the end, that is, from the upper end side toward the lower end side. In other words, the diameter of the side wall on the upper end side of the circular truncated cone part 3B is the smallest (the same as the diameter of the tubular part 3A), the diameter of the side wall on the lower end side of the circular truncated cone part 3B is the largest (the same as the diameter of the cylindrical part 3C), and the diameter of the side wall of the circular truncated cone part 3B is smoothly increased from the upper end side toward the lower end side.

The cylindrical part 3C is a part having a cylindrical shape, and as described above, the upper end side of the cylindrical part 3C connects (communicates) to the lower end side of the circular truncated cone part 3B, and the lower end side of the cylindrical part 3C faces the bottom surface of the upper cup 11. Here, in the configuration example of FIG. 1, the lower end side of the cylindrical part 3C is released (specifically, does not have a bottom surface).

Here, in the configuration example of FIG. 1 and FIG. 2, a central axis in a direction extending from the tubular part 3A to the cylindrical part 3C through the circular truncated cone part 3B in the internal hollow structure body 3 substantially matches a central axis of the upper cup 11 of the cylindrical shape. Note that the internal hollow structure body 3 may be an integral structure, or may be, as illustrated in FIG. 1 and FIG. 2, configured by combining each member of the upper tubular part constituting a part of the tubular part 3A, the lower tubular part constituting the other part of the tubular part 3A, the circular truncated cone part 3B, and the cylindrical part 3C. In the configuration example of FIG. 1, a lower end portion of the upper tubular part is connected to an outer upper surface of the upper cup 11, an upper end portion of the lower tubular part is connected to an inner upper surface of the upper cup 11, and a member consisting of the circular truncated cone part 3B and the cylindrical part 3C is connected to a lower end portion of the lower tubular part, and the internal hollow structure body 3 consisting of a plurality of members is thereby configured.

When the internal hollow structure body 3 having the above-described shape is disposed in a manner of being inserted into the upper cup 11, the inside of the upper cup 11 is divided into two spaces. The first space is a hollow part being formed inside the internal hollow structure body 3. The hollow part is hereinafter referred to as an "atomization space 3H". The atomization space 3H is a space surrounded by the inner side surface of the internal hollow structure body 3.

The space is a space formed by an inner surface of the upper cup 11 and an outer side surface of the internal hollow structure body 3. The space is hereinafter referred to as a "gas supply space 1H". As described above, the inside of the upper cup 11 is sectioned into the atomization space 3H and the gas supply space 1H.

Further, the atomization space 3H and the gas supply space 1H are connected through a lower opening part of the cylindrical part 3C.

Further, in the configuration example of FIG. 1 and FIG. 2, as can be seen from the shape of the internal hollow structure body 3 and the shape of the upper cup 11, the gas supply space 1H is the widest on the upper side of the upper cup 11 and is gradually narrower toward the lower side of the upper cup 11. In other words, a part of the gas supply space 1H that is surrounded by an outer side surface of the tubular part 3A and an inner side surface of the upper cup 11 is the widest, and a part of the gas supply space 1H that is surrounded by an outer side surface of the cylindrical part 3C and an inner side surface of the upper cup 11 is the narrowest.

The gas supply unit 4 is disposed in the upper surface of the upper cup 11. Through the gas supply unit 4, a carrier gas G4 for transferring the source solution mist MT (see FIG. 2) being atomized by the ultrasonic vibrator 2 to the outside through the tubular part 3A of the internal hollow structure body 3 is supplied. As the carrier gas G4, for example, a high-concentration inert gas can be adopted. Further, as illustrated in FIG. 1 and FIG. 2, the gas supply unit 4 is provided with a supply port 4*a*, and the carrier gas G4 is supplied into the gas supply space 1H of the container 1 through the supply port 4*a* present in the container 1.

The carrier gas G4 supplied from the gas supply unit 4 is supplied into the gas supply space 1H and fills the gas supply space 1H, and is then introduced to the atomization space 3H through the lower opening part of the cylindrical part 3C.

Further, in the ultrasonic atomization apparatus 101 of the first embodiment, the separator cup 12 of the container 1 has a cup-like shape, and accommodates the source solution 15 inside. The bottom surface BP1 of the separator cup 12 is gently inclined from a side surface part toward the center, and is formed into a spherical surface shape having a predetermined curvature.

Further, the water tank 10 is filled with ultrasonic wave conveyance water 9, which serves as an ultrasonic wave conveyance medium. The ultrasonic wave conveyance water 9 has a function of conveying ultrasonic vibration that is generated from the ultrasonic vibrator 2 disposed in the bottom surface of the water tank 10 to the source solution 15 in the separator cup 12.

In other words, the ultrasonic wave conveyance water 9 is accommodated in the water tank 10 so as to be able to convey, to the inside of the separator cup 12, vibration energy of ultrasonic waves applied from the ultrasonic vibrator 2.

As described above, in the bottom surface BP1 of the separator cup 12, the source solution 15 to be atomized is accommodated, and a liquid level 15A of the source solution 15 is positioned lower than the position at which the connector 5 is disposed (see FIG. 1 and FIG. 2).

Further, regarding the separator cup 12, the positions of the separator cup 12 and the water tank 10 are set so that the entire bottom surface BP1 is immersed in the ultrasonic wave conveyance water 9. Specifically, the bottom surface BP1 of the separator cup 12 is disposed above the bottom surface of the water tank 10 without touching the bottom surface of the water tank 10, and the ultrasonic wave conveyance water 9 is present between the bottom surface BP1 of the separator cup 12 and the bottom surface of the water tank 10.

In the ultrasonic atomization apparatus 101 having the configuration as described above, when the ultrasonic vibrators 2 apply ultrasonic vibration, vibration energy of the ultrasonic waves is conveyed to the source solution 15 in the separator cup 12 through the ultrasonic wave conveyance water 9 and the bottom surface BP1 of the separator cup 12. Then, as illustrated in FIG. 2, liquid columns 6 are raised from the liquid level 15A, and the source solution 15 transition to liquid particles and to mist, producing the source solution mist MT in the atomization space 3H. The source solution mist MT generated in the gas supply space 1H is supplied to the outside through an upper opening part of the tubular part 3A by the carrier gas G4 supplied from the gas supply unit 4.

Figure 6:
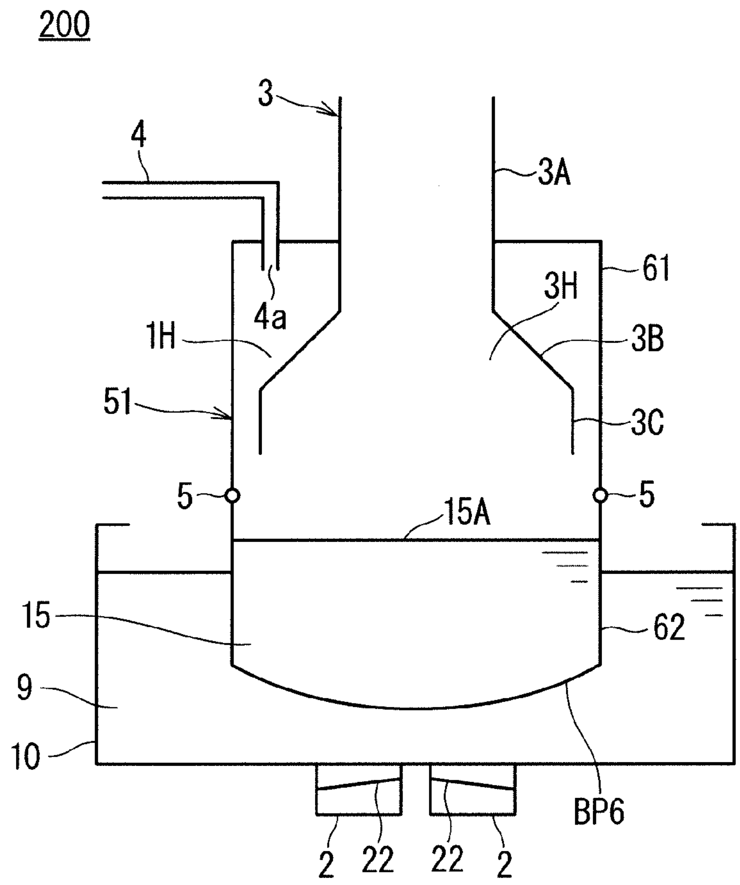
Prior Art F I G. 6
FIG. 6 is an explanatory diagram (No. 1) illustrating a configuration of a conventional ultrasonic atomization apparatus.
Figure 7:
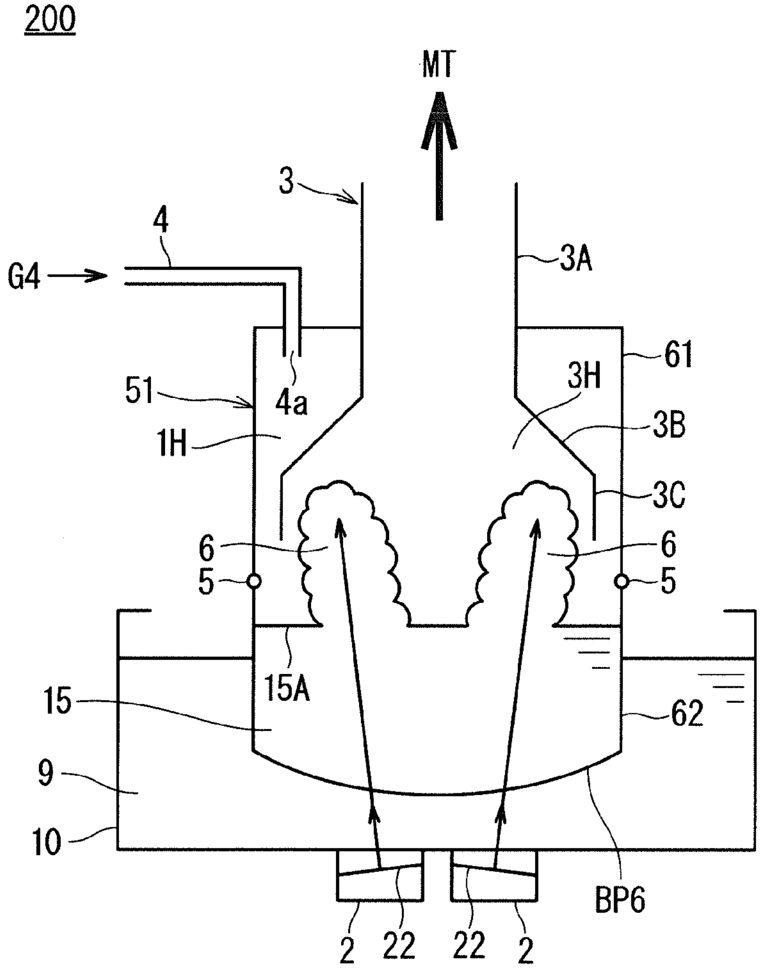
Prior Art F I G. 7
FIG. 7 is an explanatory diagram (No. 2) illustrating a configuration of the conventional ultrasonic atomization apparatus.

FIG. 6 and FIG. 7 are each an explanatory diagram schematically illustrating a configuration of a conventional ultrasonic atomization apparatus 200. FIG. 6 illustrates a case at the time of an initial state (No. 1), and FIG. 7 illustrates a case at the time of generation of a source solution mist MT (No. 2).

In the following, parts similar to those of the ultrasonic atomization apparatus 101 according to the first embodiment illustrated in FIG. 1 and FIG. 2 are denoted by the same reference signs and general description thereof will be omitted.

A container 51 corresponding to the container 1 of the ultrasonic atomization apparatus 101 is made of a combined structure of an upper cup 61 and a separator cup 62. The upper cup 61 is configured similarly to the upper cup 11.

A conventional separator cup 62 corresponding to the separator cup 12 of the first embodiment adopts polypropylene (PP) that easily transmits ultrasonic waves as its constituent material, whose entire thickness is uniformly 1.0 mm.

In order to make the thickness of the separator cup 62 as thin as possible with the aim of maintaining transmissiveness of the ultrasonic waves (preventing attenuation of vibration energy of the ultrasonic waves) and maintaining the shape of the separator cup 62, the thickness of the separator cup 62 is set to 1.0 mm.

Figure 3:
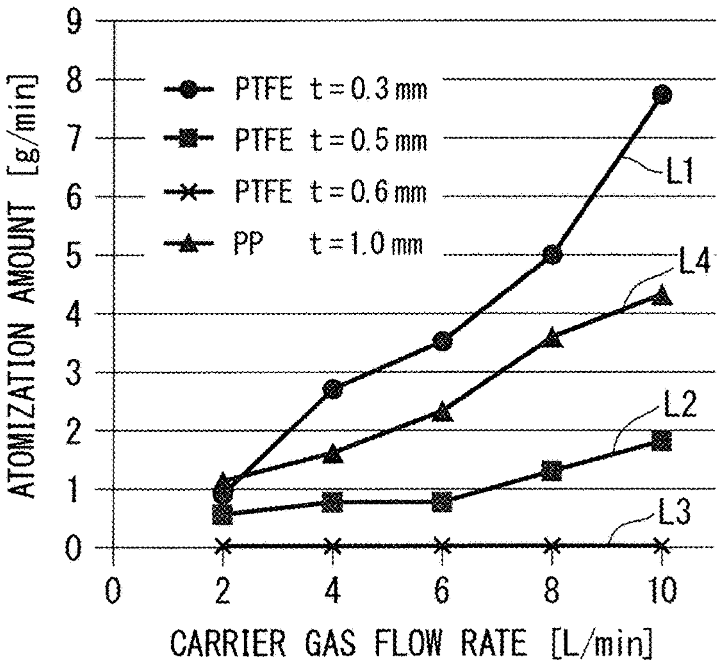
FIG. 3 is a graph showing effects of the first embodiment.

FIG. 3 is a graph showing effects of the first embodiment. In FIG. 3, the horizontal axis represents a flow rate [L/min] of the carrier gas G4, and the vertical axis represents an atomization amount [g/min] of the generated source solution mist MT.

FIG. 3 shows experimental results of an experiment performed on the condition that distilled water at 34° C. was used as the source solution 15, four ultrasonic vibrators 2, which are models NB-59S-09S-0 manufactured by TDK Corporation, were disposed in the bottom surface of the water tank 10, and vibration frequency of the four ultrasonic vibrators 2 was set to 1.6 MHz. Note that a nitrogen gas is used as the carrier gas G4.

In FIG. 3, atomization amount variation L1 shows a case in which the constituent material of the separator cup 12 is PTFE, and film thickness t of the bottom surface BP1 is 0.3 mm. Atomization amount variation L2 shows a case in which the constituent material of the separator cup 12 is PTFE, and the film thickness t of the bottom surface BP1 is 0.5 mm. Atomization amount variation L3 shows a case in which the constituent material of the separator cup 12 is PTFE, and the film thickness t of the bottom surface BP1 is 0.6 mm. Specifically, the atomization amount variations L1 to L3 are experimental results related to the ultrasonic atomization apparatus 101 according to the first embodiment.

Meanwhile, atomization amount variation L4 shows a case in which the constituent material of the separator cup 62 is PP, and film thickness t of a bottom surface BP6 is 1.0 mm. Specifically, the atomization amount variation L4 is experimental results related to the conventional ultrasonic atomization apparatus 200.

As shown by the atomization amount variation L3 of FIG. 3, when PTFE is adopted as the constituent material of the separator cup 12 and the film thickness of the bottom surface BP1 is 0.6 mm, transmissiveness of ultrasonic waves in the bottom surface BP1 of the separator cup 12 is not excellent, and the source solution mist MT cannot be substantially obtained.

However, when the film thickness of the bottom surface BP1 is set to 0.5 mm, specifically, when the bottom surface BP1 satisfies the thin film condition described above as shown by the atomization amount variation L2 of FIG. 3, transmissiveness of ultrasonic waves in the bottom surface BP1 of the separator cup 12 is improved, and the source solution mist MT can be obtained with an effective atomization amount.

In addition, when the film thickness of the bottom surface BP1 is set to 0.3 mm as shown by the atomization amount variation L1 of FIG. 3, transmissiveness of ultrasonic waves in the bottom surface BP1 of the separator cup 12 is significantly improved, and the source solution mist MT can be obtained with an atomization amount that excels the conventional ultrasonic atomization apparatus 200 shown by the atomization amount variation L4.

As can be understood from the experimental results of FIG. 3, it was confirmed that the atomization amount of the source solution mist MT reaches a practical level regarding transmissiveness of ultrasonic waves if the film thickness of PTFE adopted as the constituent material of the separator cup 12 was set to 0.5 mm or less.

In addition, it was confirmed that the atomization amount of the source solution mist MT reaches a high standard excelling the related art regarding transmissiveness of ultrasonic waves if the film thickness of PTFE adopted as the constituent material of the separator cup 12 was set to 0.3 mm or less.

Note that transmissiveness of ultrasonic waves is determined by acoustic impedance. Acoustic impedance of fluorocarbon resins, including PTFE, is approximately 1.15[$\times 10^6$ kg/m$^2$s], and thus it is estimated that results similar to those of the case shown in FIG. 3 can be obtained if fluorocarbon resin is used as the constituent material of the separator cup 12.

As described above, regarding the ultrasonic atomization apparatus 101 according to the first embodiment, a configuration that the thin film condition regarding the separator cup 12 that "the thickness of the bottom surface BP1 is 0.5 mm or less" is satisfied is referred to as a basic configuration, and a configuration that a limited thin film condition regarding the separator cup 12 that "the thickness of the bottom surface BP1 is 0.3 mm or less" is satisfied is referred to as a limited configuration. Specifically, the thin film condition described above includes the limited thin film condition described above.

As described above, the constituent material of the separator cup 12 in the ultrasonic atomization apparatus 101 according to the first embodiment is PTFE being fluorocarbon resin. The fluorocarbon resin as typified by PTFE has properties of having relatively high tolerance to various solvents. Thus, the separator cup 12 of the ultrasonic atomization apparatus 101 can exert relatively high tolerance to the source solution 15.

In addition, through satisfaction of the thin film condition that "the thickness of the bottom surface BP1 is 0.5 mm or less", the separator cup 12 having the basic configuration according to the first embodiment enhances transmissiveness of ultrasonic waves in the bottom surface BP1, and can thus generate the source solution mist MT with the atomization amount at the practical level.

As a result, the basic configuration of the ultrasonic atomization apparatus 101 according to the first embodiment produces effects of enabling generation of the source solution mist MT that is excellent in tolerance to the source solution 15 and that has an approximate atomization amount.

In addition, through satisfaction of the limited thin film condition that "the thickness of the bottom surface BP1 is 0.3 mm or less", the separator cup 12 having the limited configuration of the ultrasonic atomization apparatus 101 according to the first embodiment can further enhance transmissiveness of ultrasonic waves in the bottom surface BP1 and generate the source solution mist MT with a higher atomization amount.

Second Embodiment

Figure 4:
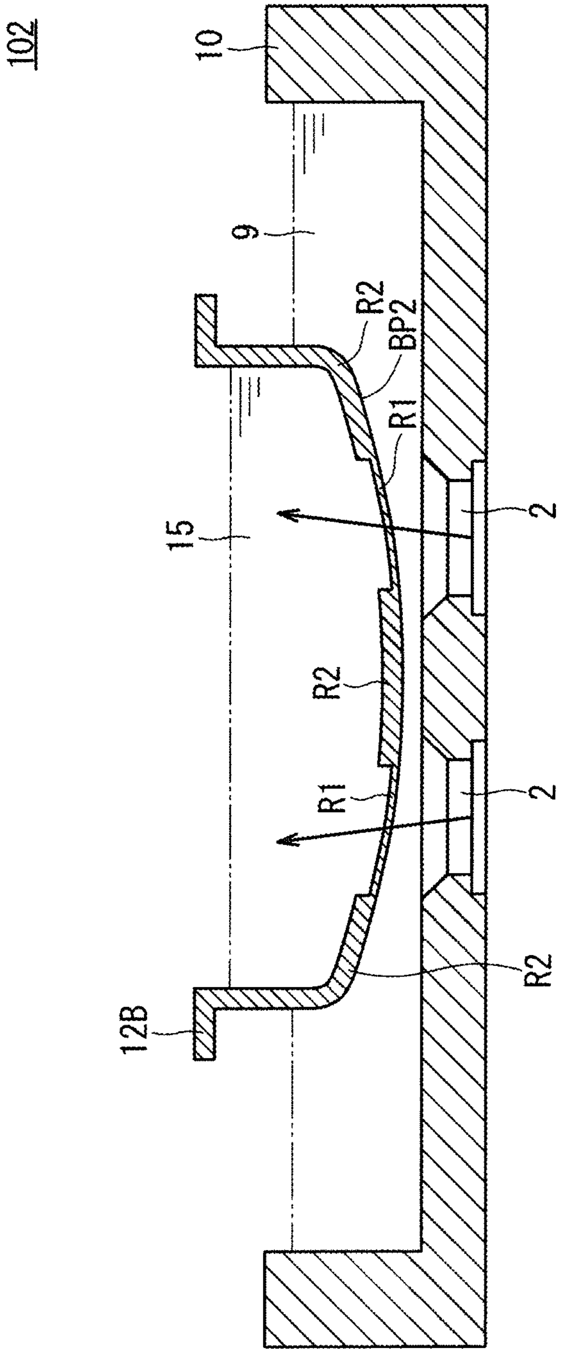
FIG. 4 is an explanatory diagram illustrating a cross-sectional structure of an ultrasonic atomization apparatus being a second embodiment.
Figure 5:
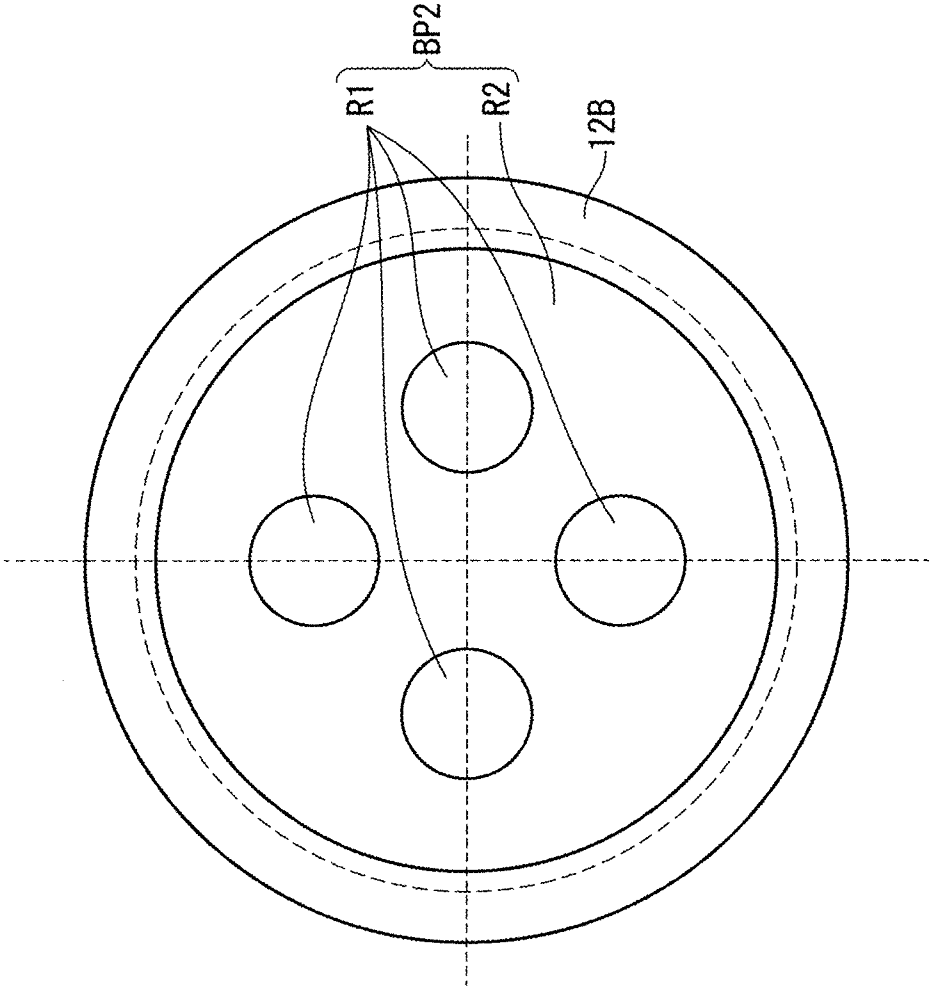
FIG. 5 is a plan view illustrating a planar structure of a bottom surface of a separator cup illustrated in FIG. 4.

FIG. 4 is an explanatory diagram illustrating a cross-sectional structure of a separator cup 12B in an ultrasonic atomization apparatus 102 being a second embodiment of the present invention. FIG. 5 is a plan view illustrating a planar structure of the bottom surface BP2 of the separator cup 12B illustrated in FIG. 4. FIG. 5 illustrates a plan view as seen from the bottom surface BP2 side.

In FIG. 4 and FIG. 5, constituent elements similar to those of the ultrasonic atomization apparatus 101 according to the first embodiment are denoted by the same reference signs to omit description thereof as appropriate, and features of the second embodiment will mainly be described.

As illustrated in FIG. 4 and FIG. 5, the separator cup 12B is different from the separator cup 12 according to the first embodiment in that the bottom surface BP2 does not have a uniform film thickness but has two types of film thicknesses. This will be described below in detail.

The bottom surface BP2 is separated into four thin film regions R1 each having a relatively small film thickness of 0.5 mm or less, and a thick film region R2 having a relatively large film thickness of larger than 0.5 mm.

The four thin film regions R1 are set to correspond to the four ultrasonic vibrators 2. Each of the four thin film regions R1 is set in a region including the entire ultrasonic wave transmission region through which the ultrasonic waves applied from a corresponding ultrasonic vibrator 2 transmit. Further, in the bottom surface BP2, the entire region except for the four thin film regions R1 is set to the thick film region R2. Further, the film thickness of the side surface and the upper surface of the separator cup 12 is also set to the same film thickness as the thick film region R2.

In this manner, the bottom surface BP2 of the separator cup 12B includes four thin film regions R1 corresponding to the four ultrasonic vibrators 2. Each of the four thin film regions R1 includes an ultrasonic wave transmission region that allows transmission of the ultrasonic waves generated from a corresponding ultrasonic vibrator 2 out of the four ultrasonic vibrators 2.

Further, the separator cup 12B of the ultrasonic atomization apparatus 102 according to the second embodiment has its thickness (<0.5 mm) of the four thin film regions R1 set smaller than the thickness (>0.5 mm) of the other region.

In this manner, in the bottom surface of the separator cup 12B according to the second embodiment, each of the four thin film regions R1 satisfies the thin film condition that "the thickness is 0.5 mm or less" and the thick film region R2 does not satisfy the thin film condition described above.

Figure 8:
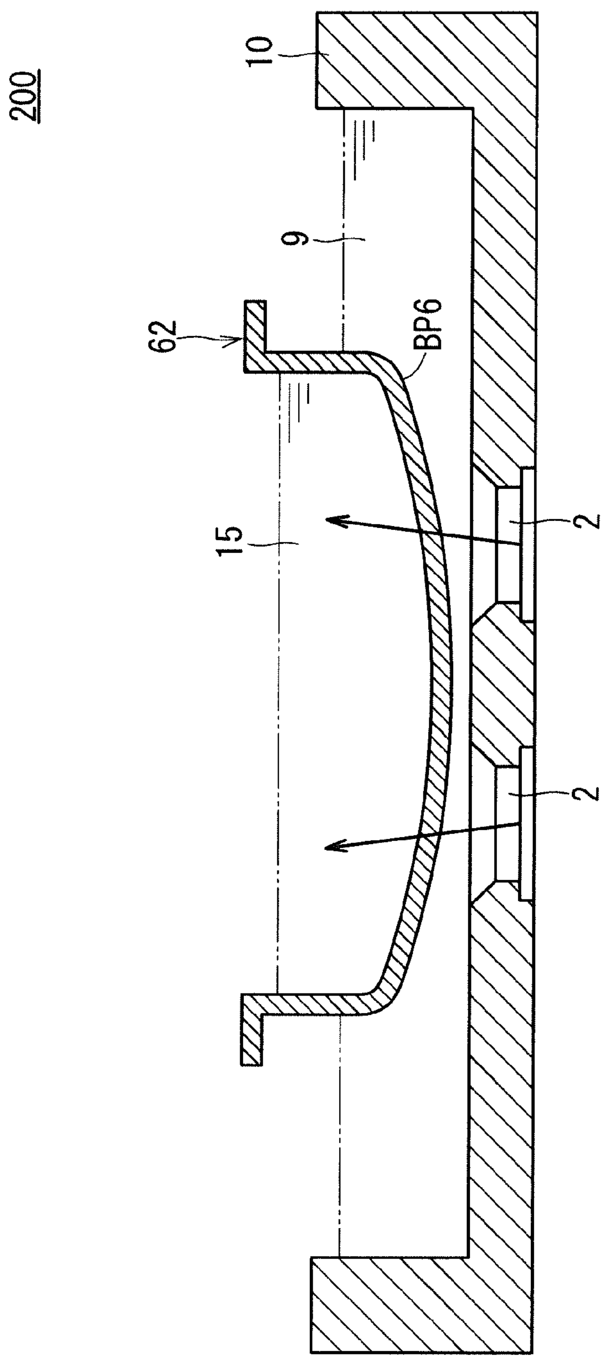
Prior Art FIG. 8
FIG. 8 is an explanatory diagram illustrating a cross-sectional structure of the conventional ultrasonic atomization apparatus.
Figure 9:
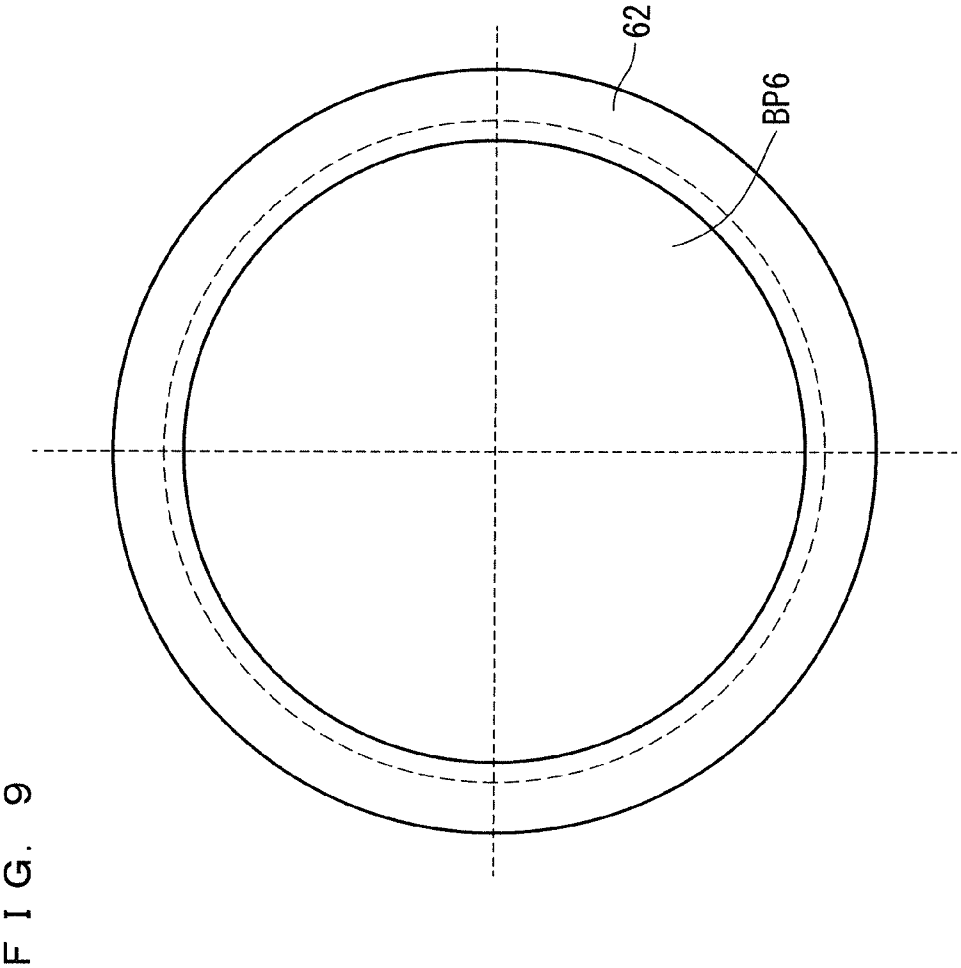
FIG. 9 Prior Art
FIG. 9 is a plan view illustrating a planar structure of a bottom surface of a separator cup illustrated in FIG. 8.

FIG. 8 is an explanatory diagram illustrating a cross-sectional structure of the conventional ultrasonic atomization apparatus 200. FIG. 9 is a plan view illustrating a planar structure of the bottom surface BP6 of the separator cup 62 illustrated in FIG. 8. FIG. 9 illustrates a plan view as seen from the bottom surface BP6 side.

In FIG. 8 and FIG. 9, constituent elements similar to those of the ultrasonic atomization apparatus 200 illustrated in FIG. 6 and FIG. 7 are denoted by the same reference signs to omit description thereof as appropriate.

As illustrated in FIG. 8 and FIG. 9, the separator cup 62 has a uniform film thickness in the bottom surface BP6 as well. Specifically, the bottom surface BP6 is uniformly set to 1.0 mm. Further, the film thickness of the side surface and the upper surface of the separator cup 62 is also set to the same film thickness (1.0 mm).

In this manner, the ultrasonic atomization apparatus 102 according to the second embodiment has features in that, in the bottom surface BP2 of the separator cup 12B, the four thin film regions R1 (at least one thin film region) satisfy the thin film condition described above, and the thick film region R2 being the other region except for the four thin film regions R1 does not satisfy the thin film condition described above.

Regarding the ultrasonic atomization apparatus 102 according to the second embodiment, owing to the features described above, by setting the film thickness of the thick film region R2 to be relatively large of larger than 0.5 mm in the separator cup 12B, tolerance to the source solution 15 can be enhanced to the maximum.

In addition, the ultrasonic atomization apparatus 102 according to the second embodiment satisfies the thin film condition that the four thin film regions R1 each including the ultrasonic wave transmission region has a "thickness of 0.5 mm or less", similarly to the ultrasonic atomization apparatus 101 according to the first embodiment.

Thus, the ultrasonic atomization apparatus 102 according to the second embodiment produces effects of enabling generation of the source solution mist MT with an appropriate atomization amount, similarly to the ultrasonic atomization apparatus 101 according to the first embodiment.

Note that, as a matter of course, the source solution mist MT of a higher atomization amount can be generated in the second embodiment as well by setting the thickness of the four thin film regions R1 to 0.3 mm or less so as to achieve satisfaction of the limited thin film condition as in the limited configuration according to the first embodiment.

While the present invention has been shown and described in detail, the foregoing description is in all aspects illustrative and not restrictive. It is therefore understood that numerous unillustrated modifications can be devised without departing from the scope of the present invention.

The invention claimed is:

1. An ultrasonic atomization apparatus comprising:

a container including a separator cup configured to accommodate a source solution at a lower part;

an internal hollow structure body including a hollow inside being provided above said separator cup in said container;

a water tank configured to accommodate an ultrasonic wave conveyance medium inside, said water tank and said separator cup being positioned so that a bottom surface of said separator cup is immersed in said ultrasonic wave conveyance medium; and a plurality of ultrasonic vibrators provided in a bottom surface of said water tank, wherein said separator cup uses fluorocarbon resin as a constituent material, said separator cup is integrally formed by a cylindrical side surface and a bottom surface without a joint member, said bottom surface of said separator cup is inclined from a bottom end of said cylindrical side surface toward a center of said bottom surface of said separator cup, and is formed into a spherical surface shape having a predetermined curvature, said bottom surface of said separator cup includes a plurality of thin film regions corresponding to said plurality of ultrasonic vibrators, and each of said plurality of thin film regions includes an ultrasonic wave transmission region allowing transmission of ultrasonic waves applied from a corresponding ultrasonic vibrator out of said plurality of ultrasonic vibrators, in said bottom surface of said separator cup, said plurality of thin film regions satisfy a first thin film condition, and other region except for said plurality of thin film regions does not satisfy said first thin film condition, in said bottom surface of said separator cup, each of said plurality of thin film regions has a recess at a contact side contacting said source solution and does not have a recess at a contact side contacting said ultrasonic wave conveyance medium, said first thin film condition is that said thickness of said plurality of thin film regions in said bottom surface is 0.5 mm or less, entire thickness of said separator cup including the cylindrical side surface and the bottom surface other than said plurality of thin film regions is uniform and satisfying a second thin film condition, and said second thin film condition is that the entire thickness of said separator cup other than said plurality of thin film regions is larger than 0.5 mm.

2. The ultrasonic atomization apparatus according to claim 1, wherein said water tank and said separator cup being positioned so that at least a part of said cylindrical side surface of said separator cup is immersed in said ultrasonic wave conveyance medium in said water tank from horizontal direction.

3. The ultrasonic atomization apparatus according to claim 1, wherein said container includes an upper cup having a cylindrical shape, said upper cup and said separator cup are coupled by a connector along circumference of said cylindrical side surface of said separator cup.

4. The ultrasonic atomization apparatus according to claim 3, wherein a liquid level of the source solution is positioned lower than a position at which said connector is disposed in lateral view.

5. The ultrasonic atomization apparatus according to claim 1, wherein said first thin film condition includes a limited thin film condition that said thickness of said plurality of thin film regions in said bottom surface is 0.3 mm or less.

* * * * *